US012811415B2

(12) United States Patent
Bede et al.

(10) Patent No.: US 12,811,415 B2
(45) Date of Patent: Nov. 24, 2026

(54) STATE OF CHARGE ALIGNMENT OF ENERGY MODULES OF AN ENERGY STORAGE

(71) Applicant: KK Wind Solutions A/S, Ikast (DK)

(72) Inventors: Lóránd Bede, Herning (DK); Anders Eggert Maarbjerg, Ulstrup (DK)

(73) Assignee: KK Wind Solutions A/S, Ikast (DK)

( * ) Notice: Subject to any disclaimer, the term of this patent is extended or adjusted under 35 U.S.C. 154(b) by 801 days.

(21) Appl. No.: 18/256,671

(22) PCT Filed: Dec. 14, 2021

(86) PCT No.: PCT/DK2021/050363

§ 371 (c)(1),
(2) Date: Jun. 9, 2023

(87) PCT Pub. No.: WO2022/128031

PCT Pub. Date: Jun. 23, 2022

(65) Prior Publication Data

US 2024/0039304 A1 Feb. 1, 2024

(30) Foreign Application Priority Data

Dec. 14, 2020 (DK) ................................ 2020 70833

(51) Int. Cl.
*H01M 10/44* (2006.01)
*H01M 10/42* (2006.01)
(Continued)

(52) U.S. Cl.
CPC ........... *H02J 7/56* (2026.01); *H01M 10/4207* (2013.01); *H01M 10/425* (2013.01);
(Continued)

(58) Field of Classification Search
CPC ........ H02J 7/56; H02J 7/54; H02J 7/82; H02J 7/52; H01M 10/4207; H01M 2010/4271; H01M 10/48
(Continued)

(56) References Cited

U.S. PATENT DOCUMENTS

2013/0241472 A1 9/2013 Feuerstack et al.
2015/0295442 A1 10/2015 Seymour et al.
(Continued)

FOREIGN PATENT DOCUMENTS

CN 108711901 A 10/2018
CN 110034597 A 7/2019
(Continued)

OTHER PUBLICATIONS

Danish Search Report dated Jun. 22, 2021 issued in Patent Application No. PA 2020 70833.
(Continued)

*Primary Examiner* — Edward Tso
(74) *Attorney, Agent, or Firm* — Lee & Hayes, P.C.

(57) ABSTRACT

The invention relates to an energy storage (1) and a method of controlling an energy storage where at least one of a plurality of series connected energy modules (5*a*-5*n*) is connected in a reverse polarity energy module so that the positive terminal thereof is connected to the positive terminal of a first energy module of the plurality of series connected energy modules of the string, and the negative terminal is connected to the negative terminal of a second energy module of the plurality of series connected energy modules of the string or at least one energy module of the plurality of energy modules is bypassed for a specific current flow direction through the battery string.

18 Claims, 3 Drawing Sheets

Figure 1:
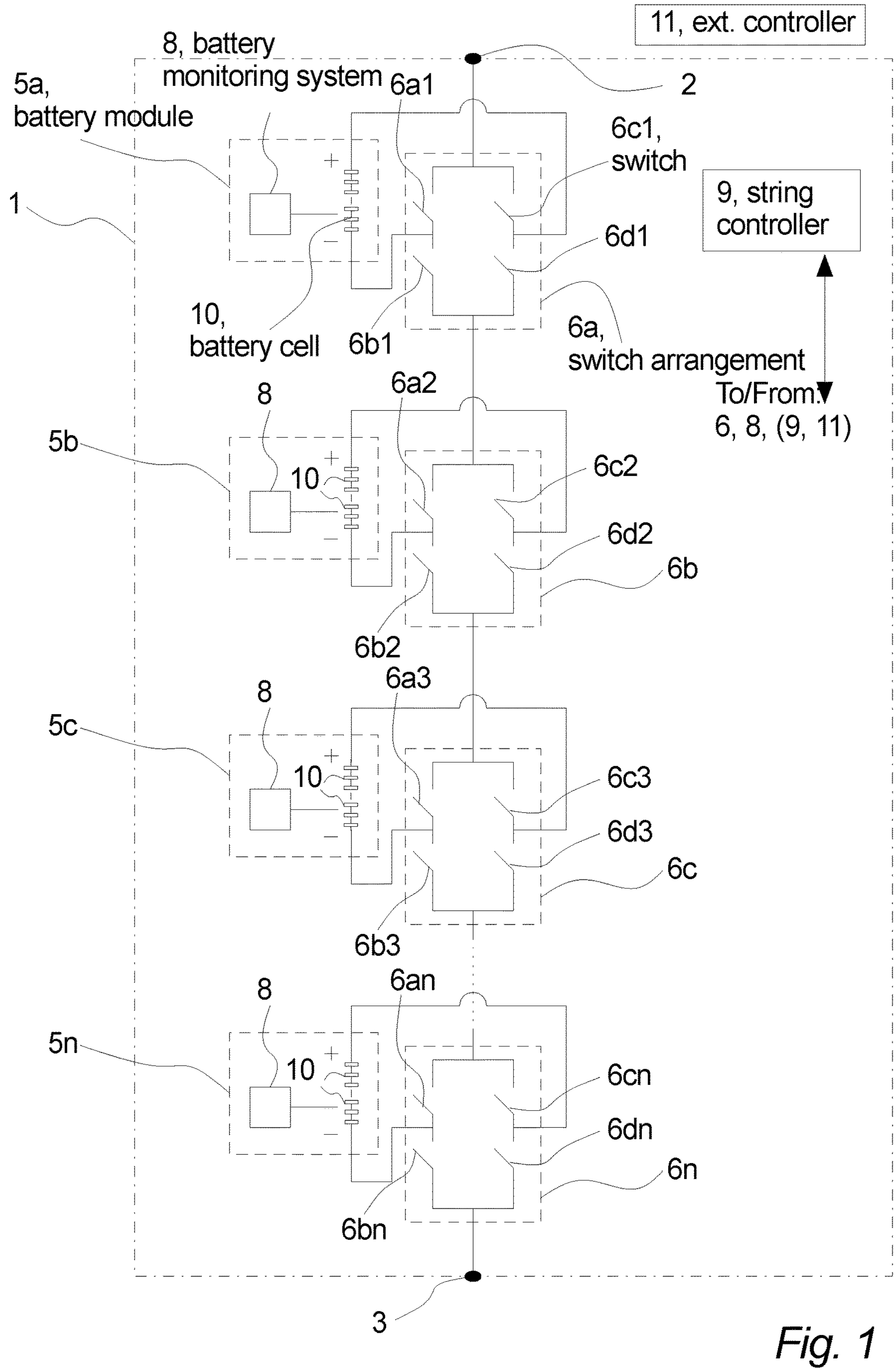

(51) Int. Cl.
*H01M 10/48* (2006.01)
*H02J 7/54* (2026.01)
*H02J 7/56* (2026.01)
*H02J 7/82* (2026.01)

(52) U.S. Cl.
CPC ............. *H01M 10/482* (2013.01); *H02J 7/54* (2026.01); *H02J 7/82* (2026.01); *H01M 2010/4271* (2013.01)

(58) Field of Classification Search
USPC ................. 320/107, 118, 119, 132, 149, 150
See application file for complete search history.

(56) References Cited

U.S. PATENT DOCUMENTS

| | | | | |
|---|---|---|---|---|
| 2019/0103750 | A1 | 4/2019 | Kristensen | |
| 2019/0154763 | A1* | 5/2019 | Bertness | H01M 10/4207 |
| 2019/0245355 | A1 | 8/2019 | Weil et al. | |
| 2020/0185934 | A1* | 6/2020 | Zavodny | H02J 7/56 |
| 2021/0111642 | A1 | 4/2021 | Weyh et al. | |

FOREIGN PATENT DOCUMENTS

| | | | | |
|---|---|---|---|---|
| DE | 202017102722 | U1 | 6/2017 | |
| DE | 102018116480 | A1 * | 5/2019 | H01M 10/4207 |
| EP | 2 619 842 | A2 | 7/2013 | |
| EP | 2 757 653 | A1 | 7/2014 | |
| EP | 3 482 473 | A1 | 5/2019 | |
| WO | 2014-145756 | A1 | 9/2014 | |
| WO | WO-2020259769 | A1 * | 6/2020 | H02J 7/56 |
| WO | 2022-128031 | A1 | 6/2022 | |

OTHER PUBLICATIONS

International Search Report dated Mar. 22, 2022 issued in PCT/DK2021/050363.

Written Opinion dated Mar. 22, 2022 issued in PCT/DK2021/050363.

* cited by examiner

STATE OF CHARGE ALIGNMENT OF ENERGY MODULES OF AN ENERGY STORAGE

FIELD OF THE INVENTION

The invention relates to a method of aligning an operation parameter of an energy module of an energy storage and an energy storage implementing such method.

BACKGROUND OF THE INVENTION

Energy storages based on strings of battery modules are known in the art e.g. from EP2619842 disclosing a power supply system comprising a controllable energy store used for controlling and supplying electric power to an electric machine. The energy storage comprise parallel power supply branches each of which includes at least two serially connected energy storage modules. Each energy storage module comprises at least one electric power cell having an associated controllable coupling unit. The coupling units bridge the associated power cells or connect the associated power cells to the respective power supply branch in accordance with control signals.

A similar system is described in US20190103750 which in addition is disclosing to connect one string to another string to facilitate simultaneous charge of one string and discharge of the other string.

EP3482473 disclose a method for equalizing states of charge of a plurality of battery modules of a battery. This is done by identifying each of the battery modules which is to be discharged by means of a load resistor. The method comprises carrying out, for each battery module a first evaluation of its state of charge which occurs at a first time on a first day and/or of a first quantity of electrical energy and/or of a second quantity of electrical energy. An estimate for the second quantity of energy is supplied by the battery to a load during the first day. The method comprises determining for each identified battery module whether a discharge time, at which the respective battery module is discharged by means of the load resistor which is associated with it, occurs during the first day.

A problem with prior art energy storages is that the SOC of the individual energy modules are poorly aligned and the capacity of the energy modules are thus poorly utilised.

SUMMARY OF THE INVENTION

The present invention solves these problems by monitoring operating parameters such as state of charge of the individual energy modules of the energy storage, align the operation parameters such as state of charge and thereby distribute load more equally between energy modules.

In addition, a problem solved by the present invention is the problem with different SOC (SOC; State Of Charge) in energy modules of a string SoC is that the system/string can only be discharged until the energy module with the lowest SoC hits the discharge limit, and can only be charged until the energy module with the highest SoC reaches the charge limit. In other words, the capacity of the string is not fully utilized if the SOC of one energy module is below others. The present invention is especially advantageous in situations, where an energy module is replaced. In such situation, the method of the present invention is much faster than known methods to align SOC of the new module with the old modules and in addition, the string is operable during the alignment.

More specifically, the present invention solves the problems of the prior art by controlling the energy modules of a string individual so as to ensure that an operation parameter such as the state of charge of each energy module is within an allowed range/at a desired level while at the same time ensure that the energy storage is always available e.g. for delivering power to a system for which it serves as backup power supply. This individual control includes connecting at least one energy module of the string in a reverse polarity to the other energy modules of the string.

The invention relates to a method of controlling a current path through an energy storage comprising a string of series connected energy modules between a first terminal and a second terminal, wherein the inclusion of one or more energy modules in the current path is controlled by switching arrangements each of which associated with one of the energy modules and wherein the switching arrangements are controlled by a string controller. The method comprises the step or controlling the switching arrangements to establish a series connection of a plurality of the energy modules, and wherein the controlling of the switching arrangements is characterised in that at least one of the series connected energy modules being part of the current path through the string is being discharged or charged by connecting it with reverse polarity compared to at least one other energy module being part of the current path. Note that one or more from this list may be used.

A string comprising a plurality of energy modules may include two energy modules of which one is connected in reverse polarity compared to the other. The mode or polarity of the individual modules are preferably controlled by the string controller controlling the switching arrangements but could at least indirectly be controlled by other controllers than the string controller. When the string comprises at least two modules connected with the same polarity i.e. when the positive terminal of the first module of the plurality of energy module is connected to the negative terminal of the second module of the plurality of energy module, the module with reverse polarity is connected opposite i.e. with its positive terminal to the positive terminal of one of the first or second modules.

The method has the effect, that the energy module that is being connected in reverse polarity to the one or preferably more other energy modules of the string can thus be discharged or charged as the only module in the string. Thereby it is possible to cycle or align only one module of a string at the time while maintaining backup supply capacity of the string (to loads connected to the string). Thereby a capacity estimation of the modules and thus of the string can be made while maintaining backup supply capacity of the string (to loads connected to the string)

Note that the energy modules and string may also be referred to as battery modules and battery strings. This way of referring to modules and string is preferred when the module comprise only of battery cells and the string comprise only of battery modules.

The specific current flow direction specifies if the individual energy module in the string of series connected energy modules is either being charge or discharge until a certain parameter threshold is reached. Such parameter threshold could be related to SOC i.e. to align SOC of all energy modules or allow a full discharge/charge cycle. This is advantageous in that based thereon it is possible to define that a certain energy module shall be charged and only charged, e.g. to a certain SOC, independent of the other energy modules of the string i.e. independent of if the other energy modules are being charged or discharged. Hence, in case the other energy modules of the string are discharging at a specific point in time, the energy module chosen to be charged, is bypassed. Similarly, when the other energy modules are charging at a specific point in time, the chosen energy module will also be charged. In an embodiment, the chosen energy module may be maintained in the current path all the time while charging, while the other modules are only in the current path depending on their position on the output list sorted according to SOC. This function is especially useful in situations, where the number of energy module does not facilitate providing the required output of the string at the same time as applying the reverse polarity function. Hence, by this function only one energy module in addition to the number of energy modules required to comply with the required output is needed.

This is advantageous in that it is possible to align the state of charge of energy modules of the string to have as much energy available in the string as possible, whether it is for sink or source applications.

The sequentially bypassing of the same energy module should be understood as only connecting this energy module to the string to facilitate either charge or discharge of that energy module. More specifically it should be understood as the one energy module is only connected to the string when the current runs out of the string if the one energy module is to be discharged and vice versa if the one energy module is to be charge.

This is advantageous in that by reversing polarity of an energy module of the string it is possible to cycle one energy module at the time while maintaining the availability of the energy storages to work as intended e.g. as power supply and/or for being charged. Cycling of energy modules of a string is advantageous in that the capacity of the energy module can then be determined and the end of lifetime of the energy module can be prolonged.

This is further advantageous in that it is possible to align and thereby equalise operation parameters such as state of charge of energy modules of the string while maintaining the availability of the energy storages to provide its predetermined function e.g. as power supply for a load. In case the energy storage is connected to a wind turbine, the load could be any part of the auxiliary system. In case the energy storage is connected to the utility grid, the grid or auxiliary services could be defined as a load. In case the energy storage is used as charger for electric vehicle, the batteries of the electric vehicle could be defined as load. Hence, many types of loads can be connected to the energy storage in dependency of in which system the energy storage is used.

Particularly, it is advantageous in the situation where a energy module of the string has to be replaced and state of charge of the new energy module has to be aligned with the state of charge of the existing energy module of the string.

Accordingly, the method is advantageous in that while maintaining functionality of the energy storage, it is possible to optimize the string, determine capacity of the string and maintain energy modules to prolong lifetime thereof.

Inclusion of an energy module in the string includes connecting the energy module in a first and second polarity and bypassing the energy module from the other energy modules of the string.

According to an advantageous embodiment of the invention, the method is implemented in an energy storage as described herein.

According to an advantageous embodiment of the invention the reverse polarity is obtained by connecting the positive terminal of a first energy module of the plurality of series connected energy modules of the string to the positive terminal of a second energy module of the plurality of series connected energy modules of the string It should be mentioned, that connecting positive terminals of two modules also implies that two negative terminals are connected of two modules. Hence, as will be described below, this will also implies a reverse polarity coupling. Reverse polarity may be established of one module either with respect or remaining modules in a string or direction of current through the string. Note that reverse polarity may also sometimes be referred to as inversing polarity.

According to an advantageous embodiment of the invention, the at least one energy module of the plurality of energy modules that is being discharged or charged is bypassed for a specific current flow direction through the string.

According to an advantageous embodiment of the invention, the energy module connected in reverse polarity is discharged or charged when the string does not supply a load. This is advantageous in that it has the effect, that a complete recycling of a module and thus the entire string of modules one by one can be done while the energy module in function of backup supply is in a standby mode ready for supplying a load. Note that depending on the required demands from the energy storage and/or the capacity of the energy storage more than one energy module at the time may be cycled/connected in reverse polarity.

According to an advantageous embodiment of the invention, the energy modules comprise a plurality of series connected battery cells.

Accordingly, the energy modules may also below be referred to as battery modules and the string of series connected battery modules may below be referred to as a battery string.

According to an advantageous embodiment of the invention, the energy module that is connected in reverse polarity is the energy module that has the lowest state of charge of the energy modules of the string. This is typically true when the module is to be charge. If the module is to be discharge, typically a module with a high or highest state of charge is chosen.

This is advantageous in that it has the effect, that by charging only the one energy module having lower state of charge than the others energy modules of the string, the available energy in the energy storage e.g. in case of a grid outage is increased while all the time having the energy storage available. By using the method of the present invention, it will drastically reduce the charging duration of the module with low SOC, because the charge current is not limited by the energy modules that has reached >90% SOC.

Further, it is advantage to discharge an energy module with higher SOC to the same low SOC as the other energy modules if the ability of the energy storage to sink current from the grid (e.g. in relation to frequency regulation) is needed.

According to an advantageous embodiment of the invention, the string controller controls the current path through the string comprising a plurality of battery modules according to a normal mode of operation where a required number of battery modules are connected in series with the same polarity, the required number of battery modules is determined by the required output voltage, wherein the string controller switch from normal mode of operation to reverse polarity mode of operation if at least one state of charge defining parameter of a battery module reaches a threshold value, if a predetermined period of time has passed since a battery module has been cycled, if a battery module reaches predetermined number of cycles or when a battery module has been replaced wherein the reverse polarity mode of operation includes reversing polarity of at least one battery module.

In some embodiments, all energy modules will be connected to deliver the output voltage required by the load. However, if the string comprises 12 modules and only 9 is needed to establish the required output voltage, 3 modules are bypassed.

Controlling the string i.e. at least one energy module in the reverse polarity mode when either a threshold value for a parameter is reached, a predetermined period has passed or if a battery module is replaced, is advantageous in that lifetime of a battery module can be prolonged and/or wear of battery modules can be reduced, capacity of the energy modules and thus the energy storage is maintained and condition for accurate capacity estimation of an energy module can be achieved without taking the energy storage out of operation.

Connecting battery modules in series with the positive terminal of one battery module to the negative terminal of another battery module is referred to as a first polarity or normal polarity. Connecting one battery module in series with the positive terminal connected to the positive terminal of another battery module, or with the negative terminal connected to the negative terminal of another battery module is referred to as a second polarity or reverse polarity.

If current is delivered from the battery string, then if all battery modules are connected in series having the same polarity and the same capacity, all battery modules are discharged equally. However, if the actual capacity of each individual battery module is not the same, then the state of charge of the different battery modules will change different in the individual battery modules even if the discharge current is the same through the battery modules. Therefore, to make it easier for the string controller to calculate the actual/predict the future capacity of the battery modules and thereby of the battery string, the capacity of the individual battery modules should be kept substantially equal which can be ensured by means of the reverse polarity control mode of operation including the cycle mode of operation of the present invention.

Note that, one or more battery modules could also be bypassed i.e. not contributing to the output of the battery string, then the remaining battery modules would be discharged while the state of charge of the one or more bypassed battery modules will remain unchanged and the difference of state of charge will increase.

According to an advantageous embodiment of the invention, the threshold value of a particular state of charge defining parameter is determined as a percentage of an average value of a plurality of energy modules of the string for this particular state of charge defining parameter.

The current path is controlled according to the normal mode of operation, i.e. where the positive terminal of one battery module is connected to the negative terminal of another battery module, until a state of charge defining parameter reaches a threshold value for at least one battery module. The state of charge defining parameter may be received from a battery monitoring system associated with the individual battery modules. Hence typically, the battery string is controlled according to the normal mode of operation most of the time i.e. more time than according to the reverse polarity mode of operation. The threshold value may be 1% independent of type of parameter.

According to an advantageous embodiment of the invention, the predetermined period of time is at least 1 week, least 1 month or at least 12 months since last cycling of a battery module or since a battery module was first included in the battery string.

Cycling of energy modules when this is a battery module is advantageous in that it helps to prolong the lifetime of the individual battery module and determine capacity of a module. The frequency of the cycling of battery modules may be determined based on the age of the battery module in that as a module is aging, the capacity reduces faster.

According to an advantageous embodiment of the invention, at least one energy module is bypassed during the normal mode of operation and/or during the reverse mode of operation.

According to an advantageous embodiment of the invention, the string controller receives state of charge defining parameters from an energy module monitoring system associated with each of the energy modules based on which the reverse polarity energy module is selected from the energy modules of the string.

The state of charge defining parameters are mainly and typically monitored from an energy module monitoring systems of each of the energy modules. The energy module monitoring system is often referred to as a battery monitoring system therefore comprises the relevant sensors to perform measurement of the relevant parameters. Such sensors may include voltage, current, resistance and temperature sensors.

According to an advantageous embodiment of the invention, the string controller continuously compares received values of state of charge defining parameters with the threshold value.

Alternatively, the string controller performs comparison at predetermined time intervals.

According to an advantageous embodiment of the invention, the state of charge defining parameters is selected from the list of energy module parameters comprising: internal resistance, voltage, temperature, current, state of charge, state of health and time since last cycle.

According to an advantageous embodiment of the invention, the method further comprising the step of discharging one energy module while charging a plurality of energy modules of the same string, the discharging step include:

establishing a current running into the string, connecting a plurality of energy modules in series having a first polarity, and connecting the one energy module to the series connected energy modules in a reverse polarity.

This is advantageous in that if e.g. an energy module is to be replaced by a new fully charged energy module, to reduce load on the new module it is preferred to equalise state of charge among all modules. Hence, if current, in this embodiment runs into the string, the majority of modules are charged. Because the one module is connected with reverse polarity only this module is discharged and thereby its state of charge approaches the state of charge of the majority of modules. Hence typically, first all modules are connected in the first polarity and then the polarity of one module is changed i.e. the control mode change from normal to reverse.

According to an advantageous embodiment of the invention, the method further comprising the step of charging one energy module, the charging step include:

establishing a current running out of the string, connecting a plurality of energy modules having a first polarity in series, and connecting one energy module to the series connected energy modules in a reverse polarity.

This is advantageous e.g. due to wear occurring if state of charge of one energy module is less than the majority and in that it increases the available energy in the string. Hence to avoid this, this energy module can be charged while the majority of energy modules are discharged. Hence, if current, in this embodiment runs out of the string, the majority of energy modules are discharged. Because the one energy module is connected with reverse polarity this energy module is charged and thereby its state of charge approaches the state of charge of the majority of energy modules.

Note, that the connecting of an energy module in reverse polarity to a string of energy modules having a first polarity includes selecting one of the energy modules having the first polarity in the string, and change polarity of the selected energy module.

According to an advantageous embodiment of the invention, the string controller maintains a list sorting the energy module according to one of the list comprising: state of charge, temperature, state of health and capacity.

This is advantageous in that it has the effect, that the string controller always knows which module(s) that need to be aligned i.e. e.g. if the state of charge of a module needs to be increased or decreased to be aligned with the remaining modules. Alignment of state of charge should be understood as the state of charge of aligned modules (preferably all modules of a string) is within a range of 0.5% and 5%, preferably at or between 1% and 3%.

According to an advantageous embodiment of the invention, the list is updated at least every week, at least every month or at least every year.

According to an advantageous embodiment of the invention, the list sorting the energy modules according to state of charge is updated at least hour, preferably at least every minute, most preferably at least every 10 seconds.

According to an advantageous embodiment of the invention, the string controller selects an energy module from the top or from the bottom of a list sorted according to state of charge when selecting an energy module to align with the remaining energy modules according to state of charge.

According to an advantageous embodiment of the invention, the number of energy modules connected in reverse polarity in the string is selected so as to maintain a predetermined percentage of string voltage and/or string capacity available.

This is advantageous in that more than one module can be in reverse polarity at the time. However, there should always be modules enough to deliver a required percentage of the total string voltage/capacity.

According to an advantageous embodiment of the invention the discharging of an energy module is a full discharged obtained in steps from a current state of charge to a full discharge voltage of the module is reached. The same is true for a full charge, the module is then fully charged with a full charge voltage of a module is reached. The full charge and discharge module voltages can typically be found in the data sheet of the energy module.

Moreover an aspect of the invention relates to an energy storage comprising a battery string and a string controller, the battery string is connectable to a load and comprising a plurality of battery modules each of which associated with a switching arrangement controllable by the string controller, the energy storage is characterised in that the string controller is configured for controlling the switching arrangements so that at least one of the series connected battery modules is being discharge or charge by connecting it to the battery string in reverse polarity compared to the other battery modules of the battery string.

According to an advantageous embodiment of the invention, the string controller is configured for sequentially bypass or reversing polarity of at least one of the plurality of battery modules.

The sequential bypass or reverse polarity of one battery module is advantageous in that it has the effect, that e.g. the state of charge the one battery module at the time can be aligned with the state of charge of the remaining battery modules of the battery string. The reverse polarity approach is more complex to control but at the same time faster to obtain alignment or full cycle compared to the bypass approach i.e. depending on priority is on speed or control complexity one of the two approaches can be chosen.

The sequences where a battery module is bypassed or connected to the string in reverse polarity compared to the majority of battery modules of the sting is depending on the direction of current flow into or out of the string.

According to an advantageous embodiment of the invention, the battery string controller is configured for controlling state of charge of the at least one battery module by controlling the switching arrangements so as to establish a current path through the battery string, where at least part of the current part includes:

- the positive terminal of a first battery module of the plurality of battery modules is connected to the positive terminal of a second battery module of the plurality of battery modules, and the negative terminal of the second battery module is connected to the negative terminal of a third battery module of the plurality of battery modules, or
- the negative terminal of a first battery module of the plurality of battery modules is connected to the negative terminal of a second battery module of the plurality of battery modules, and the positive terminal of the second battery module is connected to the positive terminal of a third battery module of the plurality of battery modules.

Note that one of the above options will follow the other, the normal mode/order would be to connect a positive to negative and negative to positive. Then if one module is flipped, then it would be a positive to positive connection to that module. This also means that the negative of one of these modules will be connected to the negative of the next module (not necessarily the physically next module in the string).

In an example having 3 battery modules where the middle is flipped the order of connection would be module 1 positive to output of the string; negative of module 1 to negative of module 2. Positive of module 2 can to positive of module 3.

Having a current path through a battery string in which the same terminal (positive or negative) of two battery modules are connected is advantageous in that it has the effect, that one of these battery modules are charged while the other is discharged or vice versa. In this way it is possible to control the state of charge of the individual battery modules of the battery string while the battery string it is connected to the load. Hence, by controlling the time one battery module is discharged while the remaining battery modules of the battery string are charged (or vice versa), it is possible to balance e.g. state of charge across all battery modules of the battery string and thereby establish the same or substantially the same state of charge of all battery modules of the string.

Further, it allows performing a complete cycle of one battery module of a battery string while maintaining functionality of the battery string/energy storage except for the part of the functionality that is associated with the one battery module that is discharged. Hence, the energy storage does not have to "shut down" as consequence of the required complete cycle thereby it maintain its backup function etc. during such complete cycle.

According to an advantageous embodiment of the invention, at least one energy module of the plurality of energy modules is bypassed for a specific current flow direction through the battery string.

According to an advantageous embodiment of the invention, the energy storage is implementing the method as described herein.

According to an advantageous embodiment of the invention, the string controller is configured for charging at least one battery module of the battery string, while the battery string is connected to and supplying a load.

Charging one battery module while discharging the majority of battery modules of the battery string i.e. reversing polarity of at least one battery module compared to the majority of battery modules of the battery string, while the battery string is connected to a load is advantageous in that it allows controlling or align the State Of Charge (SOC; State Of Charge) of that one battery module with the rest of the battery modules of the string.

According to an advantageous embodiment of the invention, the string controller is configured for discharging at least one battery module of the battery string, while the battery string is connected to and being charged by a power supply.

Discharging one battery module while charging the majority of battery modules of the battery string i.e. reversing polarity of at least one battery module compared to the majority of battery modules of the battery string, while the battery string is connected to a power supply is advantageous in that it allows controlling or align the State Of Charge (SOC; State Of Charge) of that one battery module with the rest of the battery modules of the string.

Reversing polarity of at least one battery module compared to the majority of battery modules of the battery string is particular relevant if the one battery module is a new battery module that has replaced an old battery module in that it is very difficult to pre-align SOC of the new battery module with the existing battery modules of the battery string.

According to an advantageous embodiment of the invention, the plurality of switching arrangements are implemented as H-bridges having a top left switch, a top right switch, a bottom left switch and a bottom right switch, and wherein the string controller, at the same point in time, is configured for controlling:

- the status of the switches of a first switching arrangement of the plurality of switching arrangements accordingly: top left switch and bottom right switch are in conducting state while top right switch and bottom left switch are in non-conducting stated, and
- the status of the switches of a second switching arrangement of the plurality of switching arrangements accordingly: top left switch and bottom right switch are in non-conducting state while top right switch and bottom left switch are in conducting stated.

According to an advantageous embodiment of the invention, the string controller is configured to establish a series connection of battery modules in which:

- the majority of the switching arrangements connects a negative terminal with a positive terminal of the subsequent battery module, and
- a group of two switching arrangements of the plurality of switching arrangements is configured for:
  - connecting a negative terminal of a first battery module with the negative terminal of a second battery module, and
  - connecting a positive terminal of the second battery module with the positive terminal of a third battery module, or
- at least one energy module of the plurality of energy modules is bypassed for a specific current flow direction through the battery string.

Controlling two switching arrangements in the same battery string so that a negative terminal of one battery module is connected to a positive terminal of a subsequent battery modules and have at least one switching arrangement which is controlled differently i.e. connecting the positive terminal of one battery module to the positive terminal of a subsequent battery module has the effect, that the latter battery module is charge while the majority of battery modules are discharge and discharged while the majority of battery modules are charged in dependency of the direction of the current flow in the current path of the battery string. The latter battery module is referred to as having reversed polarity with respect to the majority of battery modules.

According to an advantageous embodiment of the invention, the first and the second switching arrangements are located next to each other in the battery string.

This is advantageous in that it is less complicated to implement in the control strategy for the current path. It should be mentioned, that switching arrangement bypassing battery modules may be located between the first and second switching arrangement. In this situation, the first and second switching arrangements are still considered to be electrically located next to each other.

According to an advantageous embodiment of the invention, the energy storage is a high-power energy storage electrically connectable to a stationary electric system.

This is advantageous in that it has the effect that, the energy storage can operate as an uninterruptible power supply/energy storage in a wind turbine or wind power park, energy storage of/support to a utility grid, etc.

According to an advantageous embodiment of the invention, the battery string is installed in an electric cabinet.

This is advantageous in that it has the effect, that the battery string can be assembled in one location and moved to another location where it can be used and wherein it is accessible by opening a door in the electric cabinet.

According to an advantageous embodiment of the invention, the energy storage is a high-power energy storage connectable to a load of a wind turbine.

According to an advantageous embodiment of the invention, the high-power energy storage is a high-power electric energy storage configured to provide online or offline uninterruptible power supply functionality to an electric load.

According to an advantageous embodiment of the invention, the battery modules comprise a plurality of battery cells.

The number of battery cells define the battery module voltage. Hence if one battery cell is 3V, a battery module voltage is 30V if it comprises 10 series connected battery cells.

According to an advantageous embodiment of the invention, the series connection of all battery modules of the battery string facilitates delivering a higher string voltage than required by a load.

This is advantageous in that it has the effect, that one battery module can be controlled to have reverse polarity without compromising the requirements to string voltage. In practise, this implies that the string comprises at least one, preferably two battery modules more than required to deliver an output voltage required by the load.

In an aspects the invention relates to a method of controlling a current path through an energy storage comprising a string of series connected energy modules between a first terminal and a second terminal, wherein the inclusion of one or more energy modules in the current path is controlled by switching arrangements each of which associated with one of the energy modules wherein the switching arrangements are controlled by a string controller and, wherein the method comprising the step of controlling the switching arrangements to: establish a series connection of a plurality of the energy modules by connecting the positive terminal of one of the plurality of energy module to the negative terminal of another of the plurality of energy module, and wherein the controlling of the switching arrangements is characterised in that: the series connection of energy modules further comprises at least one reverse polarity energy module of which the positive terminal is connected to the positive terminal of a first energy module of the plurality of series connected energy modules of the string, and of which the negative terminal is connected to the negative terminal of a second energy module of the plurality of series connected energy modules of the string or at least one energy module of the plurality of energy modules is bypassed for a specific current flow direction through the battery string.

THE DRAWINGS

For a more complete understanding of this disclosure, reference is now made to the following brief description, taken in connection with the accompanying drawings and detailed description, wherein like reference numerals represent like parts. To increase simplicity of the figures, the parts are not illustrated in the same detailed level on all figure. So even if reference numbers are missing on FIG. 3, FIG. 3 includes the same features as FIGS. 1 and 2 such as switches in an H-bridge configuration and battery cells in the energy module.

Figure 2:
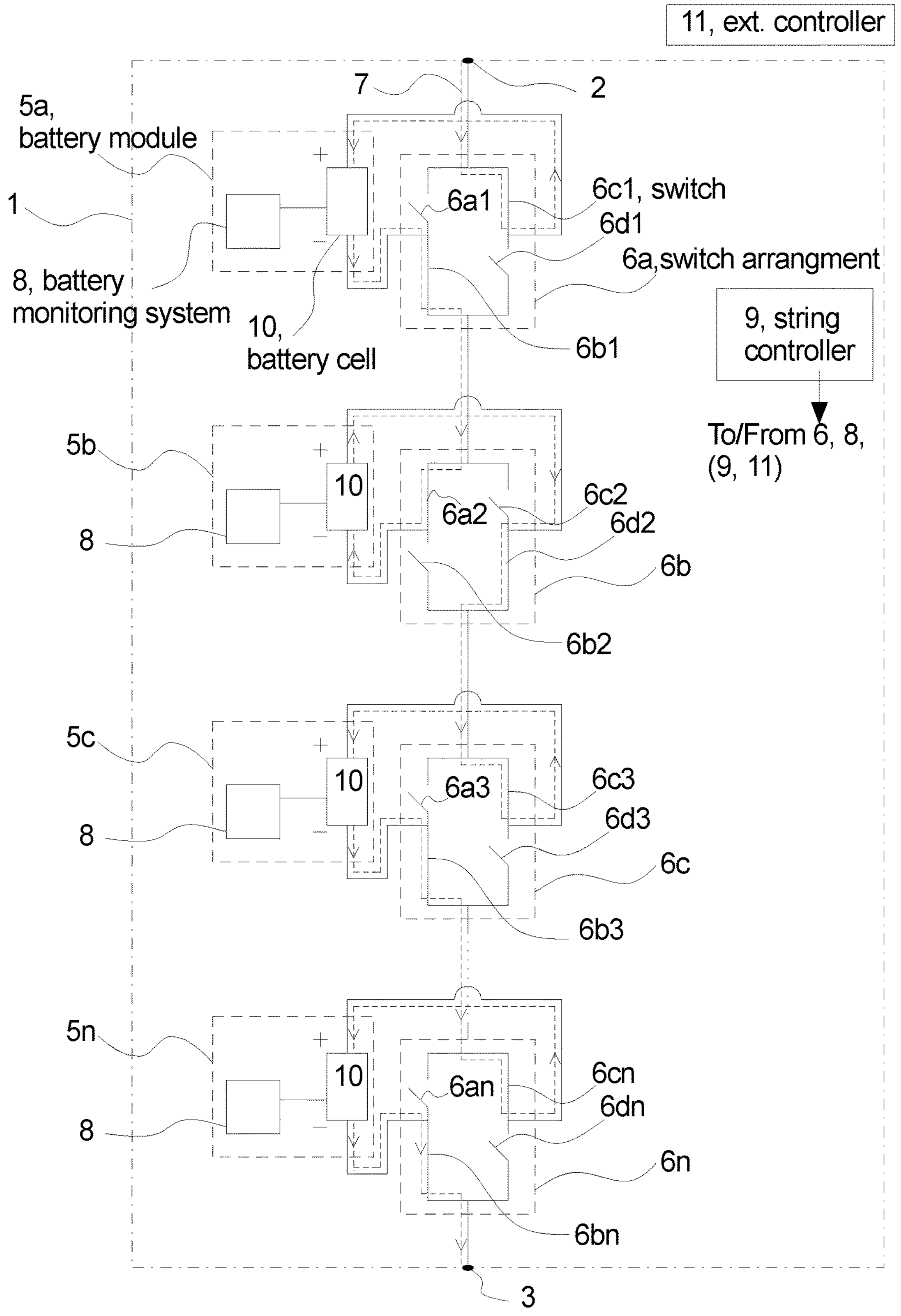
Figure 3:
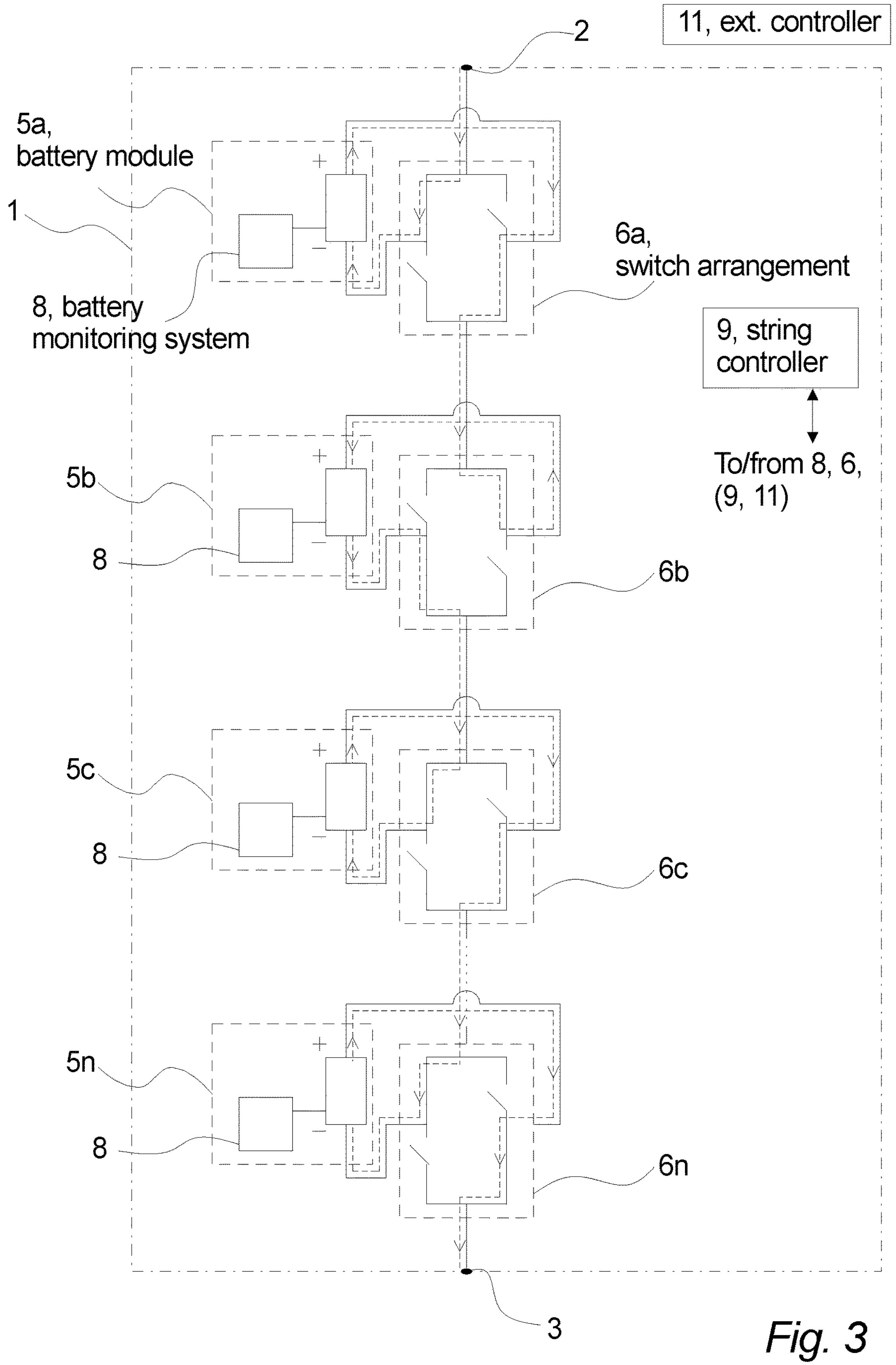

FIG. 1 illustrates an energy storage according to an embodiment of the invention, FIG. 2 illustrates a current part through a battery string according to an embodiment of the invention, and FIG. 3 illustrates an alternative current path through a battery string according to an embodiment of the invention.

DETAILED DESCRIPTION

FIG. 1 illustrates an energy storage 1 according to an embodiment of the invention. For simplicity, the illustrated energy storage 1 only includes one string 4, however the inventive control method may be applied to several strings of the same energy storage. This is indicated by the arrow from string controller 9, that indicates, that data communication between additional string controllers (also denoted 9) and external controllers denoted 11 can occur. Further, an energy storage controller (not illustrated) may also be provided at least in the case of more than one string. The energy storage controller and external controller may provide overall control, coordination between strings, provide control references to the string controller, etc. The energy module may also be referred to as a battery module even though it may not necessarily comprise batteries. It is however in an embodiment, preferred, that the energy modules comprises batteries. In the same way the string may also be referred to as a battery string. Accordingly, if an energy storage includes two, three, four, five, six or more parallel battery strings, the SOC (SOC; State Of Charge) of the individual battery modules of each of these battery strings can be controlled according to the present invention. In fact, if more than one battery string is present in the energy storage it may provide more flexibility in the control than if only one battery string is available. This may include connecting a larger number of battery modules 5 to the battery string in the so-called reverse polarity mode and thereby equalise SOC of battery modules in a string or cycle battery modules faster. It should be noted that if additional battery strings were included, an energy storage controller and additional battery string controllers would be preferred to perform control of the energy storage, whereas the battery module 5 cycling and/or equalising of SOC could be handed by the string controller 9 controlling the battery string 4. With this in mind, the invention will now be described with reference to the figures illustrating an energy storage 1 only comprising one battery string 4.

The energy storage 1 illustrated on FIG. 1 include one battery string 4 (referred to also simply as string) comprising four battery modules 5*a*, 5*n* (referred to also simply as modules). However, as indicated by the dotted line (the electric connection) between switching arrangements 6*a*-6*n* controlling module 5*c* and 5*n*, additional modules could be included in the string 4. Each module 5 comprises a plurality of battery cells 10, preferably Li-Ion battery cells, but other types could also be used including capacitors. A reference to an operation parameter such as e.g. capacity, voltage, SOC, etc. of a battery module or simply module below refers to capacity, voltage, SOC, etc. of the series connected battery cells of one battery module 5.

An operation parameter could be temperature, capacity, voltage, current, SOC, cycle, state of health, time since last time an energy module has been used or has been fully charged/discharged, internal resistance, etc. Further, each module 5 may also include a battery monitoring module/system 8 communicating with the battery string controller 9 (referred to simply as controller). The string 4 is in one end connected to a first energy storage terminal 2 and in the other end to a second energy storage terminal 3. Hence, the controller may control the switching arrangements 6*a*-6*n* to establish a battery string 4 comprising a plurality of battery modules 5 and thereby allow a current path 7 through the battery string between the first and second terminals 2, 3.

The string controller 9 may be any kind of industrial micro-controller, PLC (PLC; Programmable Logic Controller) and may communicate with other controllers including external controllers (not illustrated). The external controller could e.g. be a wind turbine controller, service provider, grid administrator, wind power plant controller, etc. Alternatively, if present, it may be an energy storage controller, coordinating control of multiple battery string controllers, which is communicating with an external controller e.g. to obtain a reference voltage for the battery string voltage.

The string controller 9 may receive input of operation parameters such as ambient temperature, voltage/voltage reference, current/current reference etc. of the system to which the energy storage 1 is connected, from systems or sensors and external controllers. This together with information received from current sensors, voltage sensors temperature sensor (if any), information stored on the memory of the controller 9, the controller 9 uses to determine e.g. state of charge/state of health of the individual modules 5, direction of current flow in the current path 7, establish desired voltage (in terms of type (AC/DC), and size), frequency or power compensation, selection and control of polarity, conducting, non-conducting or bypass of battery modules 5, etc.

The system to which the energy storage 1 may be connected to could e.g. the utility grid, a power generating system such as a wind turbine, solar or wave plant, electrolyser (producing hydrogen), an electric vehicle as either online or off line charger, etc. The energy storage may be used as either an offline or online uninterruptible power supply facilitating backup power supply to loads of the system to which the energy storage is connected. In case of a wind turbine, the load could be motors, pumps, controllers, converters, etc.

In an embodiment of the invention, the energy storage is connected to the DC-link of a power converter of a wind turbine. This particular implementation allows the energy storage to be charged or discharged via the DC voltage/current available on the DC-link.

The loads and the electric system to which energy storage is connected is in an embodiment a high-power system. High-power should in this context be defined as an electric load supplied with a voltage above 100V such as 230V, 400V or 690V, the load may either be a one or three phased AC or DC load.

In a preferred embodiment, the energy storage is a high-power energy storage suitable for connecting to a stationary load. A stationary load may be a utility grid, a renewable energy generating system such as a wind turbine, a solar system or other falling with the category. The consumption from the stationary load is typically measured in Ampere and thus a typical load connected to an energy storage of the present invention would be a one or three phased load requiring e.g. 230V, 400V, 690V with a frequency of 50 Hz or 60 Hz. However, due to the flexible nature of the battery strings of the energy storage other output voltages with other frequencies can be established. Further, the flexibility also allows the modules of the string to be charged by a variety of different voltages levels.

In another embodiment of the invention the energy storage may be connectable to an electric vehicle i.e. not part of the electric vehicle but used as an external charger for the electric vehicle.

At least some of this input to the controller 9 may be received from the battery monitoring system 8 associated or connected to each of the modules 5. The battery monitoring system 8 may be included on a battery module print along with sensors or communicating with sensors external to the module print. The battery module print may communicate with the string controller 9 via a data communication interface/communication protocol that use wireless or wired signal path. The battery module print may include information of the battery module cells 10 of the battery module 5. Hence, in the memory of the battery module print at least some of the following is stored, type of battery cell 10, (if the battery module includes capacitors or a combination of batteries or capacitors this information is also present), number of battery cells 10, capacity of such cells 10 and thereby of the entire battery module 5 (e.g. 25 Ah to 50 Ah), manufacture of the cells 10, production date of print and/or cells, installation date of battery module 5 in the string 4, times/cycles the module 5/cells 10 has been in use, temperature characteristics of the cells 10, etc.

Together internal voltage sensor (preferably one for each battery module), current sensor (if any at the individual module 5), and the battery module print may be referred to as battery management system 8. The battery module print may include communication interface between the associated switch arrangement 6 and the string controller 9 and provide information of the modules 5 and switch arrangement 6 to the string controller 9. Further, it should be mentioned that the battery module print may not comprise a micro-processor, hence the intelligence may be centralised in the string controller 9. The voltage sensor may measure the voltage of the total number of cells 10 and/or measure the voltage of each of the cells 10. In the same way, the temperature sensor may be part of the battery print and thereby provide temperature information of the battery module 5 and/or cells 10 to the string controller 9. Only one current sensor may be used and connected to the string controller to determine the current in the current path.

The switching arrangements 6*a*-*n* comprises a plurality of switches are denoted 6*a*1, 6*a*2, 6*a*3, 6*a*4, 6*b*1, . . . 6*n*4 are preferably provide on a printed circuit board. The switches of one battery modules are denoted 6*x*1-6*x*4 where x symbolise the module a, b, c, . . . n on the figures. As mentioned above, the switches 6*x*1-6*x*4 are controlled by the string controller 9 and by control hereof it is possible to either include the battery module in or bypass the battery module from the current path 7 through the string 4. The status of a switch in this document is referred to as either conducting mode or non-conducting mode. Hence, due to the H-bridge configuration of the switches 6*x*1-6*x*4, a battery module can be controlled to a first polarity or reverse polarity when connected to the remaining modules 5 forming the string 4 or being bypassed i.e. disconnected from the remaining modules 5 forming the string 4.

As mentioned, the string controller 9 may receive information from sensors/battery module print. The string controller knows the status of the switches in that they are controlled by the string controller (including historic use of the modules), hence based on this information the string controller is able to determine the most optimised way of operating the string i.e. determine which battery modules that should be included in the current path through the string at what point in time i.e. depending on requirement/capacity from load connected to the string. Hence, the string controller e.g. receives information regarding a string current and know which modules that are connected to the string to establish/absorb this current and preferably also hardware configuration of the battery module. This information is used to determine which battery modules that is going to be used i.e. connected to (including polarity)/disconnected from the string according to an overall control strategy such as balancing state of charge, completely discharge, completely charge, etc. or according to temperature, state of health, etc.

The status of a semiconductor switch 6*x*1-6*x*4 is changed between a conducting mode (switch closed) and a non-conducting mode (switch open). A deadtime between change from one status of the switch to another status is preferably adjustable between 10 nanoseconds and 1 microsecond, typically the value is a couple of 100 nanoseconds.

Preferably, the switches 6*a*-6*d* are semiconductor switches of the IGBT (IGBT; Insulated Gate Bipolar Transistor), MOSFET (MOSFET; Metal-Oxide-Semiconductor Field-Effect Transistor) type, GaN transistors (Gan; Gallium Nitride) or SiC transistors (SiC; Silicon Carbide), however other types of switches can also be used.

Accordingly, the current path 7 is established between the terminals 2, 3 via which a load can be connected to the energy storage 1. The load may be a high-power load such as a one phased or three phased load (in case of a three phased load, three strings 4 are required), the load could be an AC or a DC load, the load could be the utility grid, in this case, load would be able to charge the energy storage 1 and discharge the energy storage.

Preferably each battery module 5*x* in the battery string is connectable to the current path 7 via an associated switching arrangement 6*x*, in that it provides the most flexibility in controlling the output of the energy storage 1 (x denotes to actual module/switch pair a, b, c or n on the figures). However, one or more modules may be connected to the current path 7 directly or via a switching arrangement 6 which is different from the majority of switching arrangements 6.

Preferably, the connection of terminals of the battery modules 5 to the switching arrangements 6 are made in the same way at each battery module. This is because then it becomes easier to programme and thereby control the current path 7. With this said, it should be mentioned, that this is not a requirement. Hence, the terminals of the battery module 5 are electrically connected to the switching arrangements 6 in the same way i.e. between the two left and right switches respectively or between the two top and bottom switches respectively.

FIG. 2 illustrates a specific embodiment of the present invention, where the positive terminals of two modules 5*b*, 5*c* of the battery string 4 are connected and thereby at least one of these are connected to the other battery modules 5 in reverse polarity. In this particular example it is module 5*b* which is connected in reverse polarity in that the negative terminal of module 5*a* is connected to the negative terminal of module 5*b*. Hence, depending on direction of the current in the current path, module 5*b* can be charged while the other modules are discharged and vice versa.

On FIG. 2, the current flows from the terminal 2 into the battery string as indicated by the arrows on the current path 7. Hence, module 5*b* is discharged, while the other modules are charged. To establish reverse polarity of this particular module 5*b*, the status of the switches 6*x*1-6*x*4 of switching arrangements 6*a*-6*n* are as illustrated on FIG. 2.

There are several ways of discharging or charging one module. One is to connect a dump load to the energy storage. Another way is, as mentioned above, that the electric system can obtain or provide current from the module. Yet another way is to use one of the other modules in the string (or in a neighbouring string) to charge from or discharge to. The last way would, if certain minimum backup voltage is required, required one or more additional battery modules. This is because the voltage from the module that is going to be cycled is not available to be part of the string output string voltage. The same is true for the module that is receiving/being charged from the cycled module. Accordingly, in an embodiment the number of modules of a string may be the number of modules needed to provide the required output voltage+(plus) 2 additional modules.

The mentioned way is applicable when the energy storage is in "standby" i.e. when not in use as backup power supply for a load. It would typically be in standby mode a cycling of a module or an alignment of SOC of the modules in a string is performed. If the energy storage is in use, the switched of the module that is to be cycled can simply be controlled to be "always one" i.e. delivering until it is fully discharged. This may be done without use of the reverse polarity mode of operation.

Note that if all modules except for the one that is to be charged/discharged are bypassed, the online backup of a load feature is lost. Note that the charging voltage and current should preferably be the same when charging and discharging a module, therefore, if only one module is to be charged the voltage source connected thereby need to be able to adjust its voltage.

FIG. 3 illustrates another specific embodiment of the present invention, where the negative terminals of two modules are connected. Similar to the embodiment illustrated on FIG. 2, the switches are controlled by the string controller 9 to facilitate this particular configuration of one module 5 of the string 4 having one polarity and at least one module 5*b* having the reverse polarity.

The present invention is advantageous at least in that it facilitates aligning SOC of battery modules of a battery string thereby equalizing wear of the individual modules of the string and in that one module can be cycled thereby it is possible to perform a capacity estimation of the power available in the string.

One way of determining which battery module 5 that needs to be aligned is to store SOC values or voltage of all battery modules in an alignment list and then sort this alignment list of SOC/voltage values according numeric value, percentage, or the like. The string controller may then select from the top or bottom of this alignment list which battery module that needs to be aligned i.e. controlled in reverse polarity (sometimes referred to as controlled in the reverse polarity mode of operation) compared to the remaining modules. Below the invention is described according to sorting battery modules on the alignment list according to SOC, knowing that the battery modules could as well be sorted according to voltage, internal resistance, temperature, cycle counts, state of health, etc.

With this said, during normal operation of the energy storage, the string controller controls the switching arrangements 6*a*-6*n* so as to keep the SOC of the individual modules as close to each other as possible. Hence normally, the SOC of the modules will be controlled to be as equal as possible. So, the battery module on top of an alignment list sorted by SOC would typically be maximum 1%-5% higher than the other modules, preferably the SOC does not deviate more than 1% among the battery modules. Hence, if the alignment list is sorted so that the module that has the highest SOC is at the top of the alignment list, then this top module is selected when the energy storage is discharged. Similarly, the module at the bottom of the alignment list is selected when the energy storage is charged. In this way, during normal operation, when shaping the desired output, including AC voltage output, the string controller can sort the alignment list of battery modules according to the different operation parameters and choose battery modules from the top or bottom of the alignment list according to desired control strategy. The control strategy is normally equal sharing of loads, but could be heavier rotation of one or more modules that is to be replaced or for some reasons such as economic reasons are to be used less or more.

One situation where one module needs alignment of SOC with the rest of the modules of a string is when the one module is added to the string in exchange for another module. It is unlikely that the SOC of the new battery module would match the SOC of the other modules of the sting and even if it did, a cycling would be advantageous to know the capacity of the new module.

Hence, the reverse polarity mode of operation method described throughout this document is not relevant for SOC alignment purposes when SOC of all battery modules of a string maximum deviates e.g. with 1%. The larger deviation, the more relevant the reverse polarity method becomes. Typically, the reverse polarity control method of the present invention is triggered when the difference among battery module SOC is above e.g. 1-3%, e.g. higher than 5% or even higher than 10%. Such high difference between SOC of the battery modules could be caused due to replacement of one battery module, because two battery modules from two different strings have been swapped, or because the SOC estimation was not correct so that the actual SOC of one battery module has drifted to e.g. 100% or 0% where the SOC estimation is reset. Drifting can occur if e.g. SOC is calculated by two different methods and there is a deviation between the results thereof.

Another use of the reverse polarity mode of operation is for cycling a battery module. Such cycling may be triggered by the time since an energy module last was fully cycled.

It should be mentioned that that the string controller, in addition to the alignment list preferably also sort the battery modules on an output list. Due to aging, usage, type, etc. of the individual module, the capacity of the modules may change or drift differently over time among the modules of a string. Hence one module may need alignment before another module or be used less or more during normal operation compared to the remaining modules. The string controller may therefore during normal operation update both the alignment list and the output list at a predetermined frequency (following the control frequency or a lower frequency down to once per second or minute), when an operation value of one module reaches a threshold value, etc. to ensure alignment of e.g. SOC among battery modules of the string or estimate the capacity of the battery module of the string.

The string controller may also determine the specific location on one of the lists of one module if one module for some reason should be used in heavier (or lighter) rotation than others, if a particular module is selected to be fully cycled, etc. A lighter rotation could be relevant if e.g. a module is weak and should be preserved and only used if the capacity/voltage required from the string requires inclusion of this particular weak module. The heavier rotation of a module could be relevant in the situation where a module is to be replaced and therefore the module could be used more and loaded more than the remaining modules. One of several indications that could make the string controller place one module at a particular location on the output list is the temperature of the module.

The string controller 9 normally controls the modules 5 according to a normal mode of operation where modules 5 are connected with the same polarity to each other forming the battery string 4/current path 7 having all module for use i.e. full string output voltage available.

During operation in the reverse polarity mode, the availability of the energy storage is maintained with a reduction in output voltage capacity corresponding to the number of modules control in reverse polarity and (if any) modules needed for controlling the one module in reverse polarity mode. As already mentioned, one module can be cycled, when this is done, the controller may be said to initiate a cycle mode of operation i.e. a specific way of systematically utilising the reverse polarity mode of operation to perform a full cycle of one, preferably all modules 5 of the string 4.

As mentioned, the reverse polarity mode of operation is relevant to ensure substantially the same SOC of each module 5 in the string 4. Having substantially the same SOC of all modules or put in another way ensuring that one module is not an outlier compared to the rest of the modules is relevant e.g. in that the maximum available capacity (i.e. amps that can be pulled from the string) of the string depends on the weakest module. This is also true for the string voltage, especially if all modules are needed to establish a required output voltage from the string.

The reverse polarity mode of operation is advantageous if e.g. a battery module 5 is replaced due to service. Being able to calibrate the SOC of a module 5 when the module is in operation in the string is easier, less time consuming and requires less information/equipment and handling of the module 5 prior to installation in the string 4. Therefore, when installing a new module, it could be installed e.g. with 80% SOC and the string controller will do the final calibration to match the average SOC of the other modules of the string.

The cycle mode of operation is relevant to ensure that a module can be fully cycled e.g. once per week, month or year while remaining the backup function of the energy storage. The known alternative is to perform a complete cycling of all modules at the same time, leading to a period of time where no backup function can be provided by the energy storage. A full cycling of a battery module 5 i.e. completely discharge and subsequently full charge of a module 5 is relevant e.g. to determine capacity or state of health of the module, to restore the battery module i.e. maintain the capacity of the battery module, etc. and thereby of the string. By the cycle mode of operation according to an embodiment of the present invention one module at the time of a string 4 can be cycled with a minimum reduction of the capacity of the energy storage. To keep track of which module that has been cycled when, the string controller may store this information in a cycle list.

The terms “cycle”, “complete cycle” or “fully cycled” should in an embodiment, be understood as four steps that can be combined with AC operation (and/or DC operation) such as maintaining backup capacity. Step 1 is to discharge the module completely from its current SOC. Step 2 is to make a full charge of the module. Step 3 is to make a full discharge of the module and step 4 is to charge the module so that it is aligned with the remaining modules of the string. By performing such full cycle of a module, the string controller updates, restores, maintains the capacity of the module. When such full cycle has been made to all modules of a string, the string controller knows or is able to estimate the maximum capacity of the string and have performed important maintenance of the modules relevant to increased lifetime of the battery module.

In this way full capacity test of the energy storage can be made by cycling one (or more) battery module(s) at the time. This is advantageous in that it has the effect that the energy storage can maintain its backup function i.e. if intended to operate as an uninterruptible power supply this function can be maintained, maybe with a minor reduction in capacity (equal to the missing capacity of the module(s) being cycled), while one (or more) battery modules are being cycled.

Is should be noted, that to estimate the capacity of a battery module with highest precision, the charging and discharging current (and preferably also voltage) should be the same for the complete cycle (including full charge and full discharge). By keeping track of the current and thereby the amperes required for a complete cycle the capacity of module can be estimated.

Further it should be noted, that the order of the step of fully charging and fully discharging is not important, important to obtain the best possible calculation of capacity, is that the cycle is complete The preferred way of determining if a module is fully charged or fully discharged is to measure module voltage and current. From a data sheet of the module, the voltage of a fully charged and fully discharged module can be found and thus this information can be used to determine when a module is fully charged and fully discharged. Typically voltage and current values from a data sheet are related to a given temperature, so in embodiments, the cycling of battery modules is made in a within a specific temperature range.

In an embodiment, the charging and discharging steps 2 and 3 are preferably made at the same temperature and with the same current. Such conditions are difficult to guarantee with a load such as a motor connected to the string and therefore the cycling of modules may be preferred to be made by use of the utility grid or converter DC link as load, if such is available. A load/source is needed to interact with the string to facilitate a current to run in (charging) and out (discharging) of the current path of the string. The current used to charge/discharge a battery module may be selected from the data sheet of the battery module.

In a specific embodiment, the load connected to the battery string is used for discharging and the utility grid is used for charging. It is possible to fully supply the load when discharging, but could also choose to supply e.g. 10% (or another percentage) of the load that matches the preferred discharge rate. In that case, the utility grid supplies the load with the last percentage e.g. 90%.

The lifetime of an energy module may be affected by the discharge/charge rate, hence the discharge/charge rate should be balanced between speed and lifetime of the battery. For this reason the present invention is advantageous in that it allows almost full operation capacity of the string, hence a full cycle applied to a module does not have to be made fast and thereby compromising lifetime of the module.

In an embodiment, the current delivered to or received from a load matches the desired charging/discharging current and in such situation while the energy storage is operated in the normal mode of operation (i.e. supplying or being able to supply a required output voltage to a load), it may control one module in the reverse polarity i.e. the energy storage could be said to be operated in the normal and in the reversed polarity mode of operation simultaneously. In the same way, while the energy storage is operated in the normal mode of operation, it may control one module to be cycled i.e. the energy storage could be said to be operated in the normal and in the cycle mode of operation simultaneously In an embodiment, the cycling of a module can be done in steps as described below to ensure that the available energy or maximum available voltage in the string only is reduced with the capacity of one module. In a first step, all modules of a string are in a first polarity and is discharged by a percentage such as e.g. 5% e.g. by controlling the string voltage to facilitate a current running out of the string, to the load which may be a utility grid. In a second step, the polarity of the module that is to be cycled is reversed while the remaining modules are maintained in the first polarity. Then, with this configuration of modules, the string voltage is controlled to facilitate a current running into the string and thereby charging the modules that was maintained in the first polarity with e.g. 5%. Since the polarity is reversed of the module that is to be cycle, this module is discharged by an additional 5% and thereby being discharged by 10% in total while there is status que for the remaining modules. By following these steps i.e. only reversing polarity of the module to be cycled (or aligned with the remaining modules) every second step, the capacity is maintained for all modules that is not cycled. Thereby a predetermined service window where the energy storage is not available is not necessary, the energy storage is always available to deliver its predetermined functionality only with a reduction of capacity corresponding to the capacity of one module that is being cycled.

It should be noted that state of charge may be used with respect to the capacity of the individual battery module. Hence, because of difference in aging, wear, etc. the capacity of modules of a string is not the same and therefore 80% SOC is not necessarily the same amp hour for all modules of string.

An alternative way of obtaining alignment/cycling of modules without reverse polarity is to simply bypass the module that needs to be aligned/cycled every “second step” above. Hence, for a specific current direction the module is bypassed so that if the module has to be discharged and current runs into the string, the module is bypassed to avoid it being charge. When the current change direction and is running out of the string the module is included in the string/current path and being discharged. So that instead of changing polarity of a module, the module is simply bypassed. This, however is not as time efficient as the preferred reverse polarity method, in that it will take the double or more time, however it is less complicated to control.

Such sequentially bypassing of the same energy module until a desired e.g. state of charge is reached or a full cycle has been made should be understood as only connecting this energy module to the string to facilitate either charge or discharge of that energy module in dependency of current flow.

The connection of an energy module to the string in dependency of the current flow could be made each time the current flow matches the charge/discharge need of the one energy module, every second time, etc. Obviously, the time for alignment/cycling of an energy module is fastest if the polarity of the module is reversed when the current flow does not match the charge/discharge need, however if for some reason, such as available control resources or a desire to a less complicated control of the energy storage, the reversing of polarity is not desired, then the less fast bypassing approach could be chosen. The speed of the bypass approach could be faster or slower depending on the frequency of the sequential bypass i.e. if the module is bypassed each time the non-desired current flow is present, every second time, third, time, etc.

It should be noted, that the number of modules 5 in a string 4 may exceed the necessary number of modules with respect to string voltage. Hence, if the required string voltage is 100V, then the total voltage that can be delivered may be 125V. However, such additional module(s) is not necessary for the purpose of maintaining the energy storage in operation e.g. during alignment of module in a string.

With respect to the cycling of one battery module, additional battery modules in a string may be needed to be able to reverse the polarity of one while outputting the required/maximum voltage from the string. If e.g. 10 modules are needed to output the required voltage from the string, then two extra modules in the string is needed to reverse one module, because 10 modules minus 1 module equals 9 modules and therefore an extra module is needed in the first polarity to get a sum of 10 modules in total which in this example was required to provide the required voltage from the string.

It should be noted, that two battery modules of which the positive or negative terminals are connected via the switching arrangement does not necessary have to be successive in the battery string. One battery module that is bypassed or one that is having the first polarity may e.g. be located in between these two battery modules. Note that in this document the first polarity is used do define a configuration or connection of a battery module to the current path having a polarity that is opposite to a reverse polarity.

It should be noted that if necessary, the reverse polarity and cycle mode of operation may be interrupted and the control may return the normal mode of operation e.g. if for some reason it is not possible to deliver required string voltage or the like.

Above the invention has been described according to state of charge, however it should be noted that state of charge could be replaced e.g. by temperature or state of health. Hence, the principles of aligning state of charge of battery modules in a battery string could be made according to the present invention with respect to temperature, state of health, etc.

Note that the lists mentioned above may be kept in the string controller or memory accessible from the string controller. It may be a simple electronic table or data base.

Based on the above, it is now clear that in an embodiment, the present invention relates to controlling one energy module (above referred to as a battery module, but since it could completely or partly comprise capacitors, it could be referred to as energy module) or a string of an energy modules to have a reverse polarity compared to the majority of modules of the string. A string controller 9 is controlling if and how a module is connected in reverse polarity to the remaining battery modules forming the string via control of switching arrangements comprising switches in an H-bridge configuration that is associated with the module. Thereby facilitating charging one module while discharging other modules of the string and vice versa.

The reverse polarity is advantageous in that it allows individual control of battery modules 5 so as to align or calibrate the state of charge of the individual module to a reference state of charge which may be the average state of charge of the modules of the string. Another advantage of the reverse polarity is that one module can be cycled while maintaining operation of the energy storage. Accordingly, one by one, all modules of a string can be cycled without compromising availability of the energy storage.

Accordingly, the reverse polarity of one module can be used both in the normal mode of operation, in the reverse polarity mode of operation and in the cycle mode of operation. Preferably, the modules that are to be connected in reverse polarity are found from either an output list, an alignment list or a cycle list of modules sorted e.g. according to SOC, times since last cycles, temperature, internal resistance, etc. The internal resistance is relevant in that if a high current is required, the modules having the lowest internal resistance could then be chosen. Via the cycle list, the string controller keeps track of when a module last has been fully cycled.

Accordingly, in the normal mode of operation, the string controller may sort all modules according to an operation parameter on the so-called output list. As described above, this output list is used by the string controller to determine which of the battery modules that should be used to contribute to the output voltage/current from the string and when e.g. if the output is an AC waveform. Hence, the string controller may, according to rank of modules on the output list determine which and when a module should be used to establish the output voltage/current.

Further, the string controller may sort all modules according to an operation parameter on the so-called alignment list. As described above, this alignment list is used by the string controller to determine if it is necessary to change polarity of one or more module to ensure substantially the same value of the operation parameter of all modules of the string. If considered necessary to change polarity of a module, the string controller could be said to operate in a normal mode with reverse polarity or in a reverse polarity mode.

Further, the string controller may sort all modules according to an operation parameter and/or according to when they have been cycled on the so-called cycle list. As described above, this cycle list is used by the string controller to determine if, when and/or which module that needs to be cycled e.g. to restore capacity or as periodic maintenance. When a module is cycled, the string controller could be said to operate in a normal mode cycling a module or in a cycle mode.

LIST

1. Energy storage
2. First energy storage terminal
3. Second energy storage terminal
4. String/battery string
5. Energy module/battery module
6. Switching arrangement
7. Current path
8. Battery monitoring system
9. String controller
10. Battery cells

The invention claimed is:

1. A method of controlling a current path through an energy storage including a string of a plurality of energy modules, which are connected in a series connection, between a first terminal and a second terminal, the method comprising steps of:

controlling, via a string controller, a plurality of switching arrangements to establish the series connection of the string of the plurality of energy modules, the switching arrangements controlling inclusion of one or more of the plurality of energy modules within the current path, and the switching arrangements are controlled such that at least a first one of the plurality of energy modules within the current path through the string is being discharged or charged by connecting the at least first one energy module of the plurality of energy modules with reverse polarity compared to at least a second one energy module of the plurality of energy modules within the current path; and controlling, via the string controller, the current path according to a normal mode of operation, where a required number of energy modules are connected in series with a same polarity, the required number of energy modules being determined by a required output voltage, wherein the string controller switches from the normal mode of operation to a reverse polarity mode of operation:

if at least one state of charge defining parameter of an energy module reaches a threshold value, if a predetermined period of time has passed since an energy module has been cycled, an energy module reaches predetermined number of cycles, or when an energy module has been replaced, and wherein the reverse polarity mode of operation includes reversing polarity of the at least first one energy module.

2. The method according to claim 1, wherein the plurality of energy modules include a plurality of battery modules each a plurality of series connected battery cells and the string is a battery string, and wherein the method further comprises a step of connecting the battery string to a load and supplying the load from the battery string while at least one of the series connected battery modules is being discharged or charged by connecting the at least one of the series connected battery modules to the battery string in reverse polarity compared to other battery modules of the battery string.

3. The method according to claim 1, wherein the reverse polarity is obtained by connecting a positive terminal of the first one energy module of the plurality energy modules of the string, to the positive terminal of the second one energy module of the plurality of energy modules of the string.

4. The method according to claim 1, wherein the at least first one energy module of the plurality of energy modules that is being discharged or charged is bypassed for a specific current flow direction through the string.

5. The method according to claim 1, wherein the energy module that is connected in reverse polarity is the energy module that has a lowest state of charge of the plurality of energy modules of the string.

6. The method according to claim 1, wherein the method further comprises a step of discharging one energy module while charging a plurality of energy modules of a same string, the discharging step including:

establishing a current running into the string, connecting the plurality of energy modules in the series connection having a first polarity, and connecting the at least first one energy module to the energy modules in reverse polarity in the series connection.

7. The method according to claim 1, wherein the method further comprising the step of charging one energy module, the charging step include:

establishing a current running out of the string, connecting the plurality of energy modules having a first polarity in the series connection, and connecting the at least first one energy module to the series connected energy modules in a reverse polarity in the series connection.

8. The method according to claim 1, wherein the string controller maintains a list sorting the energy modules according to one of: state of charge, temperature, or state of health and capacity, and wherein the list sorting the energy modules according to the state of charge is updated at least every hour.

9. The method according to claim 1, wherein a number of energy modules connected in reverse polarity in the string is selected so as to maintain a predetermined percentage of string voltage and/or string capacity available.

10. The method according to claim 1, wherein discharging of an energy module of the plurality of energy modules is a full discharged obtained in steps from a current state of charge to a full discharge voltage of the module is reached.

11. An energy storage comprising:

a battery string and a string controller, the battery string being connectable to a load and including a plurality of battery modules each of which is associated with a switching arrangement controllable by the string controller, wherein the string controller is configured for controlling the switching arrangements so that at least one of the plurality of battery modules in series connection is being discharged or charged by connecting it to the battery string in reverse polarity compared to other battery modules of the battery string, and wherein the switching arrangements are implemented as H-bridges having a top left switch, a top right switch, a bottom left switch and a bottom right switch, and wherein the string controller is configured for controlling:

a status of switches of a first switching arrangement of the plurality of switching arrangements accordingly: the top left switch and the bottom right switch are in a conducting state, while the top right switch and the bottom left switch are in a non-conducting state, and the status of the switches of a second switching arrangement of the plurality of switching arrangements accordingly: the top left switch and the bottom right switch are in the non-conducting state while the top right switch and the bottom left switch are in the conducting state.

12. The energy storage according to claim 11, wherein the string controller is configured for sequentially bypassing or reversing polarity of at least one of the plurality of battery modules.

13. The energy storage according to claim 11, wherein the battery string controller is configured for controlling state of charge of the at least one battery module by controlling the switching arrangements so as to establish a current path through the battery string, where at least part of the current part includes:

a positive terminal of a first battery module of the plurality of battery modules is connected to a positive terminal of a second battery module of the plurality of battery modules, and a negative terminal of the second battery module is connected to a negative terminal of a third battery module of the plurality of battery modules, or a negative terminal of a first battery module of the plurality of battery modules is connected to a negative terminal of a second battery module of the plurality of battery modules, and a positive terminal of the second battery module is connected to a positive terminal of a third battery module of the plurality of battery modules.

14. The energy storage according to claim 11, wherein the string controller is configured for charging at least one battery module of the battery string, while the battery string is connected to and supplying a load.

15. The energy storage according to claim 11, wherein the string controller is configured for discharging at least one battery module of the battery string, while the battery string is connected to and being charged by a power supply.

16. The energy storage according to claim 11, wherein the string controller is configured to establish a series connection of battery modules in which:

a majority of the switching arrangements connects a negative terminal with a positive terminal of a subsequent battery module, and a group of two switching arrangements of the plurality of switching arrangements is configured for:

connecting a negative terminal of a first battery module with the negative terminal of a second battery module, and connecting a positive terminal of the second battery module with the positive terminal of a third battery module or at least one energy module of the plurality of energy modules is bypassed for a specific current flow direction through the battery string.

17. The energy storage according to claim 11, wherein the energy storage is a high-power energy storage connectable to a load of a wind turbine and wherein the high-power energy storage is a high-power electric energy storage configured to provide online or offline uninterruptible power supply functionality to an electric load.

18. A method of controlling a current path through an energy storage including a string of a plurality of energy modules, which are connected in a series connection, between a first terminal and a second terminal, the method comprising steps of:

controlling, via a string controller, switching arrangements to:

include one or more energy modules of the plurality of energy modules in the current path, and establish a series connection of a plurality of the energy modules by connecting a positive terminal of one of the plurality of energy modules to a negative terminal of another of the plurality of energy modules, and wherein the controlling of the switching arrangements is such that:

the series connection of energy modules further includes at least one reverse polarity energy module;

of which a positive terminal is connected to a positive terminal of a first energy module of the plurality of energy modules in of the string, and of which the negative terminal is connected to the negative terminal of a second energy module of the plurality of series connected energy modules of the string and wherein the string controller controls the current path through the string according to a normal mode of operation where a required number of energy modules are connected in series with a same polarity, a required number of energy modules is determined by a required output voltage, wherein the string controller switches from the normal mode of operation to a reverse polarity mode of operation:

if at least one state of charge defining parameter of an energy module reaches a threshold value, if a predetermined period of time has passed since an energy module has been cycled, if an energy module reaches predetermined number of cycles, or when an energy module has been replaced, and wherein the reverse polarity mode of operation includes reversing polarity of at least one energy module.

* * * * *